(12) United States Patent
Nakajima et al.

(10) Patent No.: US 6,341,043 B1
(45) Date of Patent: Jan. 22, 2002

(54) OPTICAL AXIS CONVERSION LENS

(75) Inventors: Hajime Nakajima, Tokyo (JP); Patrick Ruther, Karlsruhe (DE)

(73) Assignees: Mitsubishi Denki Kabushiki Kaisha, Tokyo (JP); Forschungszentrum Karlsruhe GmbH, Eggenstein-Leopoldshafen (DE)

( * ) Notice: Subject to any disclaimer, the term of this patent is extended or adjusted under 35 U.S.C. 154(b) by 0 days.

(21) Appl. No.: 09/568,180

(22) Filed: May 9, 2000

Related U.S. Application Data

(63) Continuation of application No. PCT/JP98/04145, filed on Sep. 16, 1998.

(51) Int. Cl.$^7$ ................................................ G02B 27/10
(52) U.S. Cl. ...................... 359/625; 359/720; 385/33; 385/36
(58) Field of Search ................................ 359/625, 627, 359/629, 631, 633, 637, 720, 831, 833, 837, 719, 813; 385/36, 33, 61, 67

(56) References Cited

U.S. PATENT DOCUMENTS 3,850,510 A  * 11/1974  Baker ........................ 359/833

FOREIGN PATENT DOCUMENTS

| JP | 4-13243 | 1/1992 |
| JP | 4-225306 | 8/1992 |
| JP | 7-154546 | 6/1995 |
| JP | 10-9813 | 1/1998 |
| JP | 10-20196 | 1/1998 |

* cited by examiner

*Primary Examiner*—Georgia Epps
*Assistant Examiner*—David N. Spector
(74) *Attorney, Agent, or Firm*—Leydig, Voit & Mayer, Ltd.

(57) ABSTRACT

An optical axis conversion lens includes an incident surface on which the light emerging from a slab light guide is incident, a cylindrical lens surface which has an optical axis C in a position or direction different from an optical axis A of the light incident on the incident surface and which converges the light in the direction of the optical axis C, a first internal reflection mirror which changes the direction of the incident light from the incident surface to an optical axis B, and a second internal reflection mirror which changes light on optical axis B to an optical axis C. By such an arrangement, it is possible to convert light on the optical axis A to the optical axes B and C without being limited by the height of the slab light guide and to form a narrow beam even at a position far away from the slab light guide.

12 Claims, 3 Drawing Sheets

OPTICAL AXIS CONVERSION LENS

CROSS-REFERENCE TO THE RELATED APPLICATION

This Application is a continuation of International Application No. PCT/JP98/04145, whose International filing date is Sep. 16, 1998, the disclosure of which Application is incorporated by reference herein.

BACKGROUND OF THE INVENTION

1. Field of the Invention

The present invention relates to an optical axis conversion lens which is used in a fine optical element having a light guide and which can freely change an optical axis of light emitted from the light guide without being limited by the height of the light guide.

2. Description of the Prior Art

Generally, light emitted into space from a light guide has lost the effect of being confined by the light guide and is diffused in the thickness direction of the light guide. Conventionally, when converting the emitted light from a light guide into light beams in space which have a narrow spread angle, the diffusion is normally suppressed by disposing a conventional lens or a cylindrical lens a rotational symmetry in proximity to an end face of the light guide.

An example of the conventional technique is provided in JP-A 10-9813. FIG. 4 is a perspective view of an optical position detector which uses a conventional bar shaped lens as disclosed in JP-A 10-9813. In FIG. 4, 101 is a substrate, 102 is a buffer layer, 103 is a first slab light guide, 104 is an input optical fiber, 105 is an optical fiber support, 106 is a first slab light guide end face which has a predetermined curved surface, 107 is a light emerging end face of the first slab light guide 103, 108 is a bar shaped lens which is used as an optical means having a uni-axial focussing operation. The bar shaped lens 108 is supported by the bar shaped lens support and is fixed to the substrate 101. 110 is a surface to be detected, 111 is a second slab light guide, 112 is a light incident end face of the second slab light guide 111, 113 is a second slab light guide end face which has a predetermined curved surface, 114a and 114b are branched light guides connected to the second slab light glide 111. 115a and 115b are output optical fibers, and X. Y. Z are rectangular coordinate axes.

The curvature of the first slab light guide end face 106 and the bar shaped lens 108 is determined so that the light beams converged by them have a focal point at approximately a central position in a desired measurement range of the detected surface 110. Furthermore, the position of the second slab light guide end face 113 and the bar shaped lens 108 is determined so that the second slab light guide end face 113 is in the focal position of the reflected light from the detected surface 110 which is converged in the Y-axis direction by the bar shaped lens.

The operation of conventional bar shaped lens will be discussed below.

Light introduced from an input optical fiber and reflected by a first slab light guide end face 106 is emitted from a light emerging end face 107 and reaches the detection surface 110 after passing through the bar shaped lens 108. The light beam reflected from the detection surface 110 enters the bar shaped lens 108 again and is introduced into the second slab light guide 111 from the incident end face 112. Then, an image of the light beam is formed at the branching point of the branched optical guides 114a and 114b and are output from the output optical fibers 115a and 115b.

Since a conventional optical axis conversion lens is constructed as above, when the height of each slab light guides 103 and 111 is limited by the diameter of the optical fibers 104, 115a, 115b or the like, the diameter of the bar shaped lens 108 is limited by the height of the slab light guides 103 and 111. In other words, it is necessary to limit the diameter of the bar shaped lens 108 so as to be the same as that of the optical fiber 104, 115a, and 115b. Thus, the problem has arisen that the diameter of the bar shaped lens is reduced and the focal distance becomes too short, so a narrow beam is not obtained at a position far away from the slab light guide.

SUMMARY OF THE INVENTION

The present invention is proposed to solve the above problems and has the object of providing an optical axis conversion lens which can freely convert the optical axis of light emerging from a light guide without being limited by the height of the light guide and which can form a narrow beam even at a position far away from the light guide.

An optical axis conversion lens of the present invention is provided with a light incident/emerging surface, a light converging cylindrical surface which converges either light emitted to an external space or incident light from the external space in one direction, and an internal reflection mirror which aligns the optical axis of the light incident/emerging surface with an optical axis of the light converging cylindrical surface.

In this way, it is possible to freely convert the optical axis of light emerging from the light guide without being limited by the height of the light guide and to form a sufficient narrow beam even at a position far away from the light guide. In addition, the optical axis of incident light from an external space may be freely converted and may be introduced into the light guide.

According to the present invention, the optical axis conversion lens is arranged on a light guide end face which emits light beam with a spread angle of θ, the aperture width of the lens is formed so as to be approximately equal to the optical distance between the principal plane of the lens and the light guide end face divided by the tangent of the spread angle θ and so as to be larger than the thickness of the light guide.

In this way, it is possible to introduce the light beam into the lens while controlling the diffusion of the light.

The optical axis conversion lens of the present invention may be manufactured by using a thick film resist lithography process and a molding process.

In this way, it is possible to mass-produce the optical axis conversion lenses with fine structure.

In the present invention, a lens, which can sufficiently control the diffusion of light beam, is manufactured by using a thick film resist lithography process and a molding process.

In this way, it is possible to mass-produce the lenses which can sufficiently control the diffusion of the light beam even with fine structure.

DETAILED DESCRIPTION OF THE PREFERRED EMBODIMENT

In order to explain the invention in more detail, the preferred embodiments of the invention will be explained below with reference to the accompanying figures.

Embodiment 1

Figure 1:
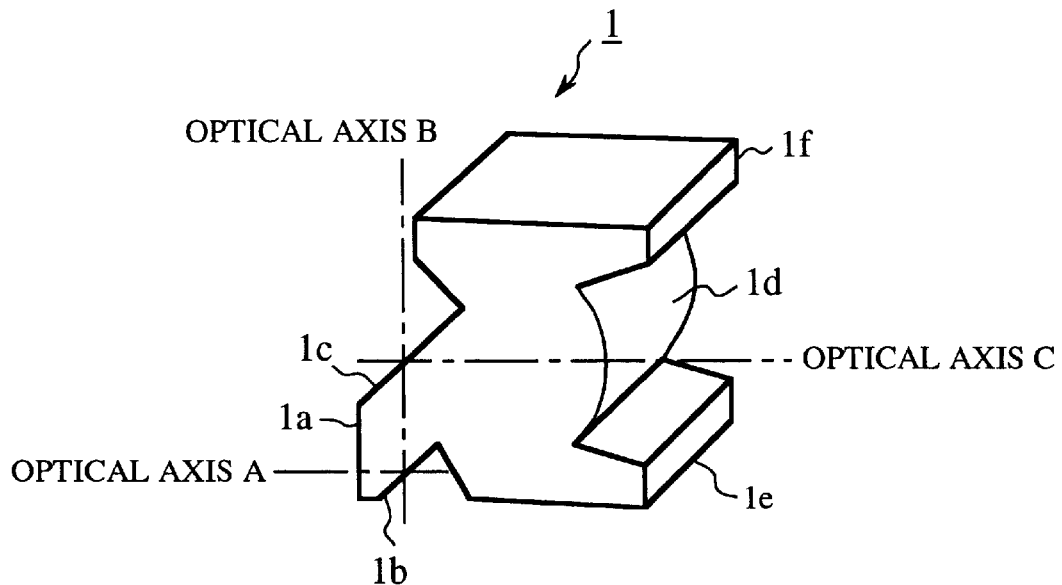
FIG. 1 is a perspective view showing a cylindrical lens according to a first embodiment of the present invention.
Figure 2:
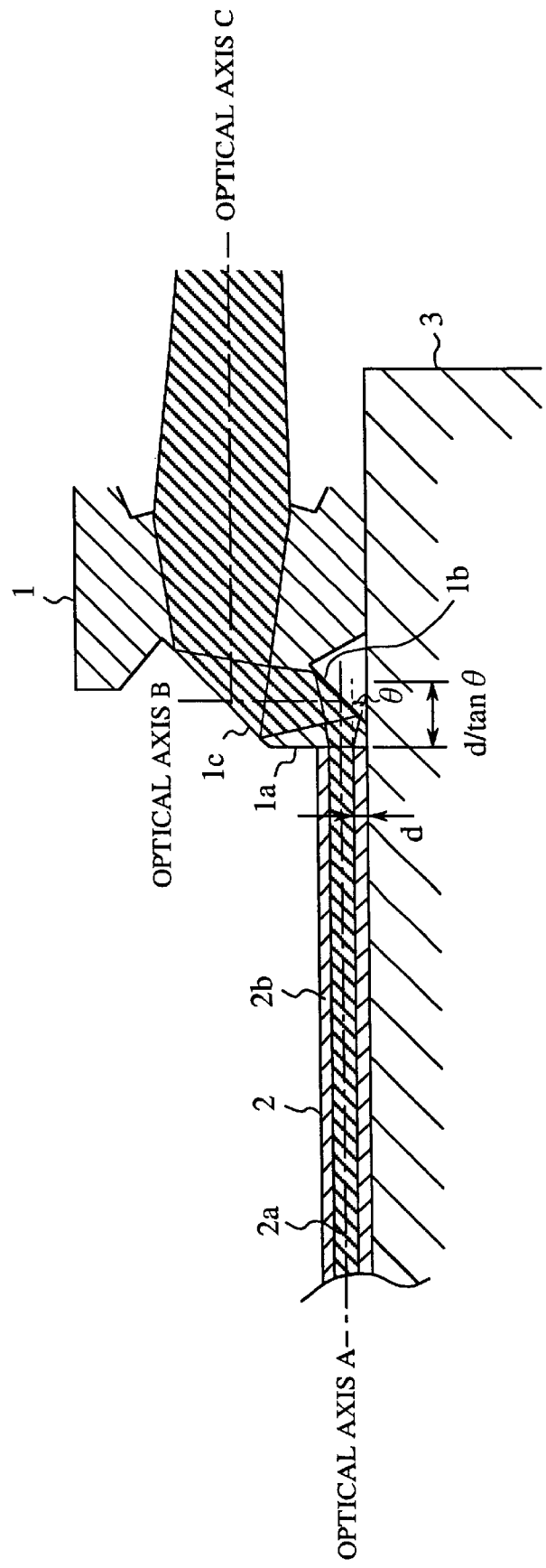
FIG. 2 is a partial cross sectional view of the cylindrical lens being used.
Figure 4:
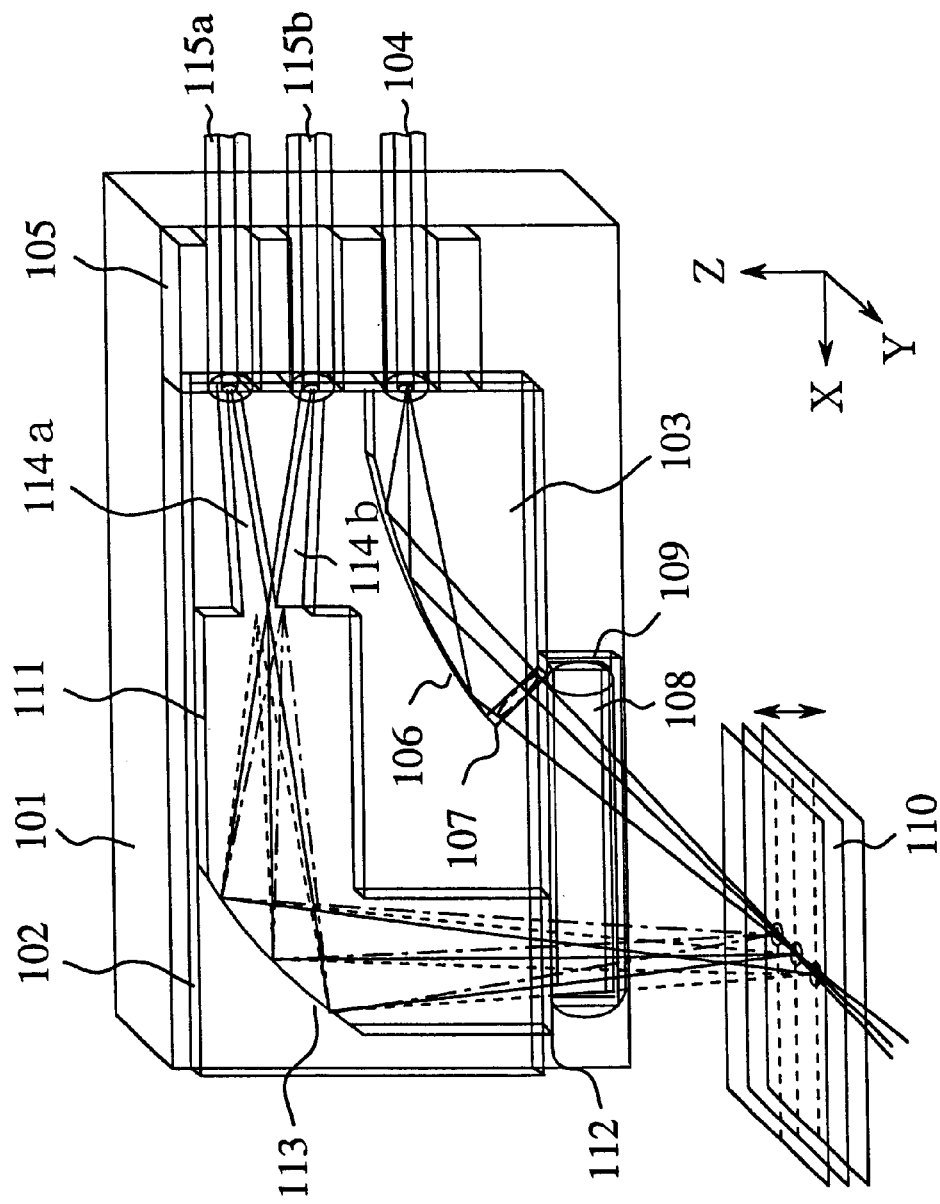
FIG. 4 is a perspective view of an optical position detector using a conventional bar shaped lens as disclosed in JP-A 10-9813.

FIG. 1 is a perspective view of a cylindrical lens according to a first embodiment of the present invention. FIG. 2 is a partial cross sectional view of the cylindrical lens being used. In FIG. 1, A, B, C are optical axes. An optical axis A is orthogonal to an optical axis B and the optical axis B is orthogonal to an optical axis C. Reference numeral 1 denotes a cylindrical lens (optical axis conversion lens), 1a is a light incident surface (light incident/emerging surface) which also functions as an emerging surface for light. 1b is a first internal reflection mirror (internal reflection mirror) for diverting incident light on the optical axis A to the light on the optical axis B. 1c is a second internal reflection mirror (internal reflection mirror) for diverting incident light on the optical axis B to light on the optical axis C. 1d is a cylindrical lens surface (light converging cylindrical surface) which converges the guided light on the optical axis C and which also functions as a light incident surface. 1e, 1f are lens protective sections which are respectively provided on the top and bottom sections in order to prevent damage to the lens surface during handling of the cylindrical lens 1.

In FIG. 2, 2 is a slab light guide (light guide) which includes a core layer 2a sandwiched by cladding layers 2b having a refractive index slightly lower than the core layer 2a. The slab light guide 2 is made of a transparent resin. The thickness of the core layer 2a and the cladding layers 2b is controlled so as to correspond with the core diameter and the cladding thickness of the input optical fiber to be explained below. d is the thickness of the cladding layers 2b, θ is the spread angle of the light beam which enters the incident surface 1a from the end portion of the slab light guide 2 and is represented by the numerical aperture (N.A) of the slab light guide 2. 3 is a substrate on which the slab light guide 2 and the cylindrical lens 1 are mounted.

The position of the first internal reflection mirror 1b will be explained below.

When the first internal reflection mirror 1b is not present, as shown in FIG. 2, the light emerging from the slab light guide 2 and entering the incident surface 1a is intercepted by the substrate 3 at a position separated by d/tan θ from the incident surface 1a. Thus, the first internal reflection mirror 1b is formed located at a position where incident light on the optical axis A, incident on the incident surface 1a, can be diverted to the optical axis B before the interception by the substrate 3.

The second internal reflection mirror 1c is located at a position where light on the optical axis B can be diverted to the optical axis C.

The cylindrical lens surface 1d has an optical axis corresponding to with the optical axis C and so that the incident light is converted into a convergent light having a focal point at a predetermined position on the optical axis C.

The focal distance and the size of the first cylindrical lens 1 are determined in accordance with the light collecting position and the spot size of the collected light which are required of the light beam after its emergence. The formula below defines imaging:

$$1/f = 1/a + b \; 1/b, \; D = bW/a$$

In the above formula, a is the optical distance from the end of the slab light guide 2 to the principal plane of the cylindrical lens 1, b is the optical distance from the principal plane of the cylindrical lens 1 to the collecting position, f is the focal distance of the cylindrical lens 1, W is the size of the core layer 2a in the slab light guide 2 and D is the desired spot size of the light at the collecting point. A distance a and a focal distance f which satisfy the above formula are determined and an aperture of the cylindrical lens 1 is determined so that the spread of the light beam at the distance a can be controlled sufficiently.

In order to obtain a light spot a few times larger than the width of the light guide at a distance more than several times the width of the light guide, the distance a is increased and the aperture of the cylindrical lens 1 exceeds the width of the light guide. In other words, it is necessary to position the optical axis C of the cylindrical lens 1 so that it differs from the optical axis A of the incident light. For these reasons, the internal reflection mirrors 1b, and 1c are disposed in the position mentioned above.

Next, an exemplary method of manufacturing an optical axis conversion lens of the present invention will be explained.

The present invention allows mass manufacture of the optical axis conversion lens with fine structure by the application of a lithograph technique to a thick film resist. Exposure using X rays is most suitable for high accuracy exposure of the thick film resist. It is possible to apply a process known by the name of LIGA (which is an acronym of the German terms for lithography, electrical casting and molding). The constituting materials have to be transparent over the wavelength of the light wave which is used, and glass, polymers or various materials may be used as the constituting materials. One example thereof will be discussed hereafter.

For example, a ceramic material, having a surface coated with a thin metallic or oxide film is coated, may be used for a substrate, and a PMMA (polymethyl methacrylate) polymer is formed with a predetermined thickness on the thin film. The thickness and refractive index of the polymer are selected so that as a light guide, the incidence/emergence of light to the optical fiber is accomplished with high efficiency.

X ray exposure using a mask on which the cross sectional shape of the cylindrical lens 1 is depicted with a metal, such as gold, as an absorbent layer, transfers the shape of the cylindrical lens 1 to the PMMA polymer. Due to excellent rectilinear propagation of X-rays during the X-ray exposure, an accurate cylindrical shape can be transferred to the PMMA polymer film having a thickness of several hundred microns (μm). After manufacturing a polymeric cylindrical structure by developing after the transfer, the structure is separated from the substrate by etching the thin film between the ceramic substrate and the polymer. Thus, it is possible to obtain a single independent structure. Since PMMA is transparent over visible light and near infrared light, it is possible to use this structure as a collimator.

Furthermore, it is possible to use an electroforming process in order to improve the productivity of the above LIGA process. In this case, electroforming is performed on the substrate on which the developed cylindrical structure is formed, and a metal such as nickel, is deposited on the surface of the substrate exceeding the height of the cylindrical structure. Since the cylindrical structure is transferred to the metal by separating the metal after casting, it is possible to produce many polymer replicas by resin molding, such as an injection molding or the like, using this female mold.

On the other hand, it is possible to use the total internal reflection in the internal reflection mirrors 1b and 1c which utilizes the difference in the refractive index between the transparent polymer and the outside (mainly air). However, if sufficient reflection is not achieved, depending on a refractive index of the transparent polymer and angle of the reflection mirror, it is possible to deposit a metal having a high reflectivity, such as silver, on the reflection mirror surface by evaporation after the formation of the cylindrical structure and use the metal as a back surface mirror.

The operation of the present invention will be explained below.

The light emerging from the slab light guide 2 is introduced into the cylindrical lens 1 along an optical axis A from the incident surface 1a of the cylindrical lens 1. This incident light with the optical axis A is reflected upwardly in the vertical direction by the first internal reflection mirror 1b and is becomes light along the optical axis B. As a result, the light beam after the reflection is not intercepted by the substrate 3. Furthermore, the incident light with the optical axis B is reflected again by the second internal reflection mirror 1c and thus its path along optical axis B is diverted to a path along optical axis C. The incident light with the optical axis C is converted into convergent light having a focal point at a predetermined position on the optical axis C by the cylindrical lens surface 1d. This forms a narrow beam at the light collecting position which is not shown in the diagram.

The cylindrical lens 1 may also be used so that the light incident from the cylindrical lens surface 1d can be emitted from the incident surface 1a.

As described above, according to the embodiment 1, it is possible to convert an optical axis A emerging from the slab light guide 2 light along optical axes B and C without being limited by the height of the slab light guide 2. Thus, it is possible to form a narrow beam at a position far away from the slab light guide 2.

In the embodiment 1, in order to reflect the incident light orthogonally, the inclination angle of each internal reflection mirrors 1b and 1c is set as shown in the figure. However, the present invention is not limited in this respect and the inclination angle may be freely set depending on the uses of the cylindrical lens 1.

Furthermore, although two internal reflection 1b and 1c are provided, the present invention is not limited in this respect. For example, a single internal reflection mirror may be provided when only reflecting light in an upward direction, and further, three or more internal reflection mirrors may be provided when a plurality of axial conversions are performed.

Embodiment 2

Figure 3:
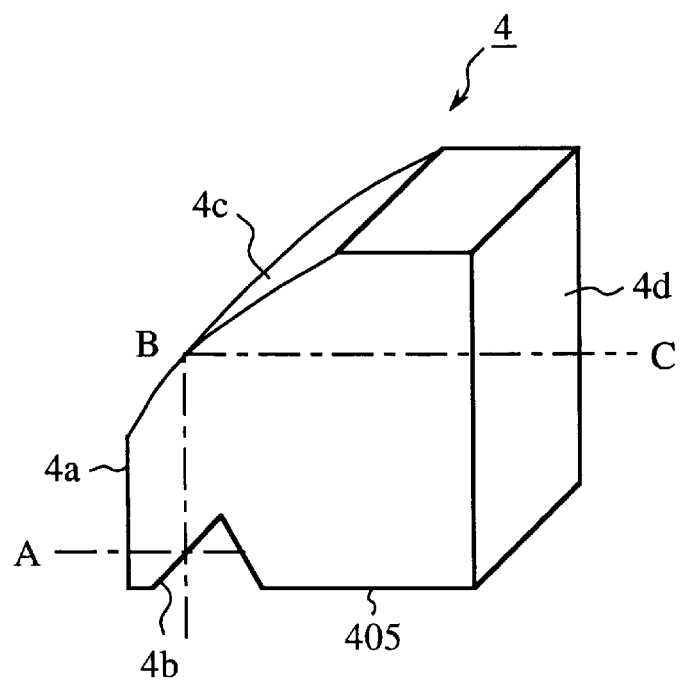
FIG. 3 is a perspective view of a cylindrical lens according to a second embodiment of the present invention

FIG. 3 is a perspective view showing a cylindrical lens according to a second embodiment of the present invention. In FIG. 3, 4 is a cylindrical lens (optical axis conversion lens), 4a is a light incident surface (light incident/emerging surface) which also functions as a light emerging surface. 4b is an internal reflection mirror which diverts light on an optical axis A to an optical axis B, the formation position and formation angle are the same as those of the first internal reflection mirror 1b in the first embodiment. 4c is a cylindrical concave mirror (light converging cylindrical surface) which diverts light on an optical axis B into light along an optical axis C and converges the light. The curvature of the cylindrical concave mirror 4c is set so that the optical axis of the reflected light corresponds with a desired optical axis C and so that a desired convergent angle is obtained. 4d is a light emerging surface which also functions as a light incident surface.

The cylindrical lens 4 may be produced by the same manufacturing method as the cylindrical lens 1 shown in the embodiment 1 of the present invention.

The operation of the present invention will be explained below.

The light emerging from a slab light guide (not shown) is introduced into cylindrical lens 4, as a guided light with an optical axis A, from a light incident surface 4a of the cylindrical lens 4. This incident light with the optical axis A is reflected upwardly in the vertical direction by the internal reflection mirror 4b and is converted into light along the optical axis B. The light with the optical axis B is further converted into light along the optical axis C by the cylindrical concave mirror 4c, converges at a desired convergent angle and emerges from the light emerging surface 4d to form a narrow beam at the light collecting position (not shown).

The cylindrical lens 4 may also be used so as to converge the light incident from the light emerging surface 4d by the cylindrical concave mirror 4c and emit the convergent light from the light incident surface 4a.

As described above, according to the embodiment 2, it is possible to convert light on optical axis A emerging from the slab light guide into light along optical axes B and C without being limited by the height of the slab light guide (not shown). Thus, a narrow beam can be formed even at a position far away from the slab light guide.

The angle of the optical axis C and the inclination angle of the internal reflection mirror 4b is not limited to that shown in FIG. 3 and may be freely set depending on the uses of the cylindrical lens 4.

Furthermore, although a single internal reflection mirror 4b is provided, the present invention is not limited in this respect and the degree of freedom for setting of the optical axis C may be increased by providing two or more internal reflection mirrors.

As described above, the optical axis conversion lens of the present invention can freely convert the optical axis of the light emerging from the light guide without being limited by the height of the light guide. The present invention is adapted for use in situations in which it is necessary to form a narrow beam at a position far away from the light guide.

What is claimed is:

1. An optical axis conversion lens comprising:

a unitary body having first and second generally opposed sides and including
      a surface at the first side and having a first optical axis along either direction of which light may be incident on the surface,
      a first internal reflector reflecting light within the body between the first optical axis and a second optical axis transverse to the first optical axis, and
      a second internal reflector reflecting light within the body between the second optical axis and a third optical axis transverse to the second optical axis; and
      converging means at one of the first and second sides for converging light incident on the converging means.

2. The optical axis conversion lens according to claim 1 wherein the first and third optical axes are parallel to each other.

3. The optical axis conversion lens according to claim 2 wherein the second optical axis is perpendicular to the first and third optical axes.

4. The optical axis conversion lens according to claim 1 wherein the converging means includes a cylindrical lens surface on the body at the second side of the body and having an axis coincident with the third optical axis.

5. The optical axis conversion lens according to claim 1 wherein the converging means includes a light converging cylindrical surface at the second internal reflector and at the first side of the body.

6. The optical axis conversion lens according to claim 5 wherein the body includes a planar surface at the second side, perpendicular to the third optical axis.

7. The optical axis conversion lens according to claim 5 wherein the first internal reflector is a planar surface of the body.

8. The optical axis conversion lens according to claim 7 wherein the planar surface and the light converging cylindrical surface are coated with a light reflecting material.

9. The optical axis conversion lens according to claim 7 wherein the body includes a planar surface at the second side, perpendicular to the third optical axis.

10. The optical axis conversion lens according to claim 1 wherein the first and second internal reflectors are parallel surfaces of the body.

11. The optical axis conversion lens according to claim 10 wherein the parallel surfaces are coated with a reflective material.

12. The optical axis conversion lens according to claim 10 wherein the converging means includes a cylindrical lens surface on the body at the second side of the body and having an axis coincident with the third optical axis.

* * * * *